United States Patent
Maletsky et al.

(10) Patent No.: US 10,353,845 B2
(45) Date of Patent: Jul. 16, 2019

(54) ADAPTIVE SPEED SINGLE-WIRE COMMUNICATIONS

(71) Applicant: Atmel Corporation, San Jose, CA (US)

(72) Inventors: Kerry David Maletsky, Monument, CO (US); Randy Melton, Colorado Springs, CO (US); Jeffrey S. Hapke, Monument, CO (US)

(73) Assignee: Atmel Corporation, San Jose, CA (US)

( * ) Notice: Subject to any disclaimer, the term of this patent is extended or adjusted under 35 U.S.C. 154(b) by 142 days.

(21) Appl. No.: 14/621,092

(22) Filed: Feb. 12, 2015

(65) Prior Publication Data

US 2016/0239448 A1 Aug. 18, 2016

(51) Int. Cl.
- *H05K 7/10* (2006.01)
- *G06F 13/40* (2006.01)
- *G06F 13/42* (2006.01)

(52) U.S. Cl.
CPC ...... *G06F 13/4068* (2013.01); *G06F 13/4282* (2013.01)

(58) Field of Classification Search
CPC .......................... G06F 13/4282; G06F 13/4068
USPC .......................................................... 710/301
See application file for complete search history.

(56) References Cited

U.S. PATENT DOCUMENTS

| | | | |
|---|---|---|---|
| 4,920,532 A | 4/1990 | Wroblewski | |
| 5,237,322 A | 8/1993 | Heberle | |
| 5,862,354 A | 1/1999 | Curiger et al. | |
| 6,301,680 B1 | 10/2001 | Cypher | |
| 6,969,970 B2 | 11/2005 | Dias et al. | |
| 7,684,482 B2 | 3/2010 | Fong | |
| 7,688,928 B2* | 3/2010 | Lin | H03L 7/06 375/376 |
| 8,107,577 B2 | 1/2012 | Ng | |
| 8,683,101 B2 | 3/2014 | Ingels | |
| 8,775,707 B2 | 7/2014 | Poulsen | |
| 2007/0147436 A1* | 6/2007 | Zumsteg | H04J 3/0605 370/509 |
| 2008/0159432 A1 | 7/2008 | Ng | |
| 2012/0102248 A1 | 4/2012 | Tailliet | |
| 2012/0144078 A1* | 6/2012 | Poulsen | G06F 13/423 710/105 |
| 2013/0322461 A1* | 12/2013 | Poulsen | H04J 3/02 370/458 |
| 2016/0092385 A1* | 3/2016 | Chilikin | G06F 13/364 710/110 |

\* cited by examiner

*Primary Examiner* — Chun Kuan Lee
(74) *Attorney, Agent, or Firm* — Fish & Richardson P.C.

(57) ABSTRACT

Systems, methods, circuits and computer-readable mediums for adaptive speed single-wire communications. In one aspect, a method includes receiving a sensing signal from a device through a single-wire bus, analyzing one or more properties of the received sensing signal, the one or more properties including at least one of a pulse width of the sensing signal and a duration between sequential pulses in the sensing signal, adjusting one or more communication parameters for single-wire communications with the device based on the analyzed one or more properties, and transmitting a specific signal to the device through the single-wire bus at an adjusted transmission speed based on the adjusted one or more communication parameters.

32 Claims, 4 Drawing Sheets

ADAPTIVE SPEED SINGLE-WIRE COMMUNICATIONS

TECHNICAL FIELD

This disclosure relates generally to communications and more particularly to single-wire communications.

BACKGROUND

Single-wire (or one-wire) communication systems may rely on carefully specified timing protocols over a single-wire bus between two or more electronic circuits. Bus times on the single-wire bus can be a single fixed constant or one of a fixed list of such constants, so that the transmission speed is fixed or selected from two or more fixed values. These systems can sometimes fail to meet specified requirements where higher performance is required or where there are significant errors generated over the single-wire bus.

SUMMARY

This specification describes systems, methods, circuits and computer-readable mediums for adaptive speed single-wire communications. In one aspect, a method includes receiving a sensing signal from a device through a single-wire bus, analyzing one or more properties of the received sensing signal, the one or more properties including at least one of a pulse width of the sensing signal and a duration between sequential pulses in the sensing signal, adjusting one or more communication parameters for single-wire communications with the device based on the analyzed one or more properties, and transmitting a specific signal to the device through the single-wire bus at an adjusted transmission speed based on the adjusted one or more communication parameters.

The details of one or more disclosed implementations are set forth in the accompanying drawings and the description below. Other features, aspects, and advantages will become apparent from the description, the drawings and the claims.

DETAILED DESCRIPTION

System Overview

Figure 1:
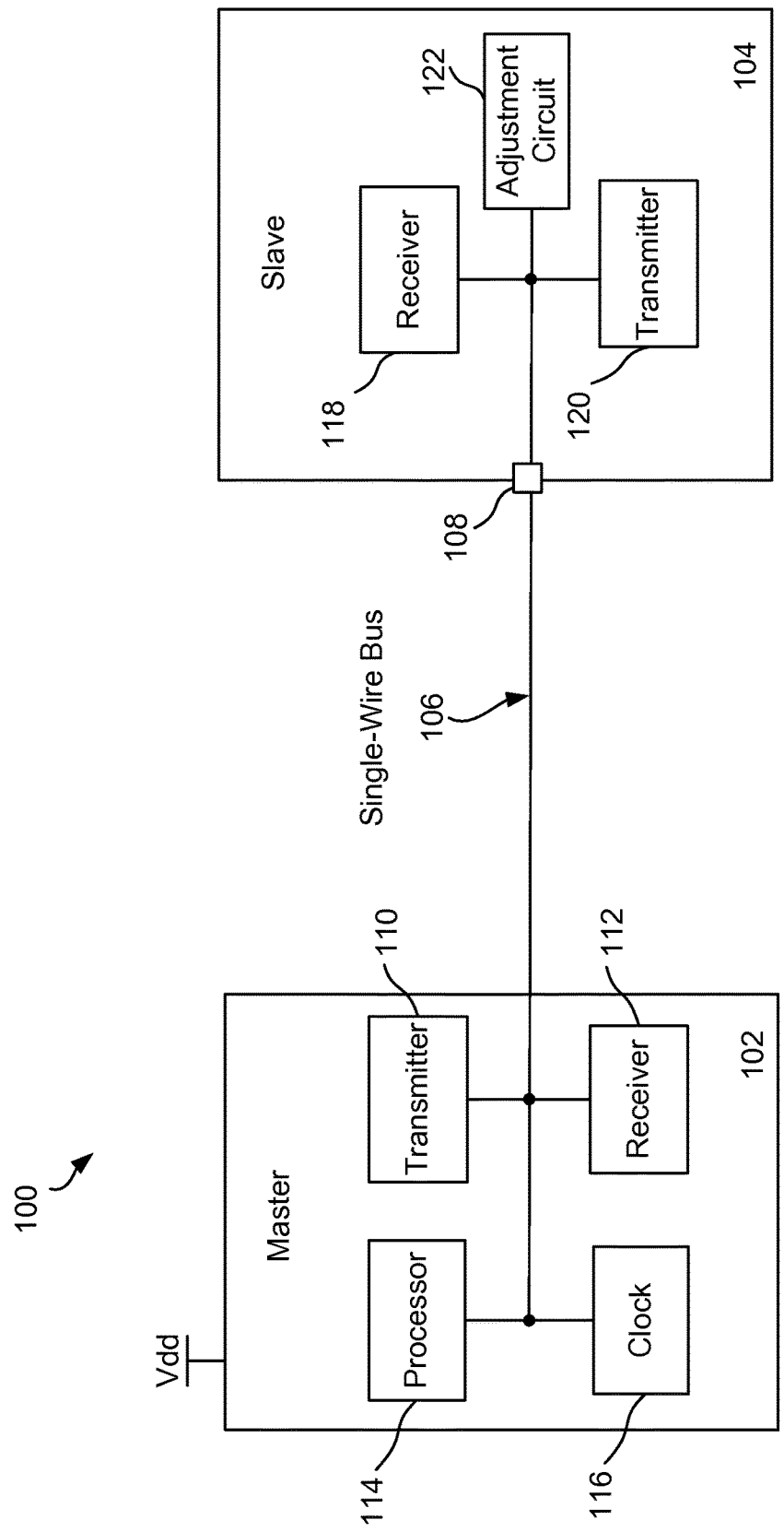
FIG. 1 is a block diagram of an example single-wire communication system.

FIG. 1 is a block diagram of an example system 100, e.g., a single-wire communication system. For purposes of illustration, the system 100 includes a master device 102 and a slave device 104 (or a single-wire device) that are connected by a single wire forming a single-wire bus 106 and share a same reference voltage, e.g., ground. The master device 102 can provide power and/or input/output for the slave device 104 through the single-wire bus 106.

The master device 102 can be any appropriate device, e.g., a circuit or a user system such as a mobile device. The master device 102 can include transmitter 110 and receiver 112 for transmitting communications signals to and receiving communications signals from the slave device 104 through the single-wire bus 106, respectively. Transmitter 110 and/or receiver 112 can include a counter. The single-wire bus 106 can be a single-wire serial bus, where the master device 102 or/and the slave device 104 transmit data sequentially, e.g., one bit at a time, over the single-wire bus 106.

The master device 102 can also power the slave device 104 through the single-wire bus 106. As illustrated in FIG. 1, the master device 102 receives a power supply voltage, e.g., Vdd. The slave device 104 draws its power supply from a regulation of a signal, e.g., a communications signal imposed by the master device 102 on the single-wire bus 106, that has its idle level at a high voltage level.

The master device 102 includes a processor 114. The processor 114 can process a number of tasks. One of the tasks can be communication with the slave device 104. In some cases, the processor 114 can be busy performing tasks, e.g., tasks unrelated to the slave 104. In those cases, the processor may not be able to execute the communication with the slave device 104 at a faster (or higher) transmission speed or bit rate. The master 102 may adopt a slower (or lower) transmission speed (or bit rate) or/and a delay. In some other cases, the processor 114 has extra resources to execute the communication. The master 102 may adopt a faster or higher transmission speed (or bit rate).

The master device 102 can include a clock circuit 116 for providing a clock signal, e.g., to transmitter 110. In some cases, the clock circuit 116 is configured to dynamically adapt the frequency of the clock signal, e.g., based on configuration information of the master device 102 such as available execution resources of the processor 114, system load, and/or system responsiveness. In some other cases, the clock circuit 114 generates the clock signal without obtaining the configuration information of the master device 102.

The slave device 104 can be an integrated circuit, for example, including a single-wire interface 108, receiver 118, transmitter 120, and/or an adjustment circuit 122. The slave device 104 communicates with the single-wire bus 106 at the single-wire interface 108. The single-wire interface 108 can be a pin on an external portion of the integrated circuit. In some examples, the slave device 104 receives power from the master device 102 through the single-wire bus 106 at the single-wire interface 108. In some other examples, the slave device 104 receives power from devices other than the master device 102. In some implementations, the slave device 104 can optionally include a processor similar to the processor 114, and/or a clock circuit similar to the clock circuit 116. The master device 102 can optionally include an adjustment circuit similar to the adjustment circuit 122.

The master device 102 can be coupled with the slave device 104 by wire connecting to the single wire or by any other appropriate electrical coupling. In some implementations, the slave device 104 is an integrated circuit having only two pins, one for the single-wire interface 108 and the other for the reference voltage, e.g., ground. In some other implementations, the slave device 104 has other pins in addition to the single-wire interface 108.

In some implementations, the system 100 includes two or more slave devices including the slave device 104. The two or more slave devices are connected to the single-wire bus 106 at respective single-wire interfaces. The master device 102 can be configured to provide both power and/or input/output for the two or more slave devices through the single-wire bus 106. In some cases, the master device 102 identifies and addresses one of the slave devices, e.g., at a period of time, for corresponding communication with the slave device. In some cases, the master device 102 could alternatively communicate with multiple slave devices at a single time. For example, the master device 102 can communicate with multiple slave devices simultaneously to indicate appropriate communications parameters and each slave device may individually respond to the master device 102.

Receiver 118 is configured to receive a communications signal from the master device 102 through the single-wire bus 106 at the single-wire interface 108 and analyze one or more properties of the received communications signal. In some examples, the communications signal is a sensing signal. The sensing signal can be a pulse, and the one or more properties of the sensing signal can include a pulse width. In some examples, the communications signal is a data signal. The data signal can be a bit, a byte, a word, a block of data, or an entire message. The one or more properties of the data signal can include information on error detection and correction (EDC) or error-correcting code (ECC).

The adjustment circuit 122 is configured to adjust one or more communication parameters for single-wire communications between the master device 102 and the slave device 104. The adjustment can be based on the analyze properties of the received communications signal. The communication parameters can include a transmission speed or bit rate, a time period between sequential signals, a transmission direction between the master device 102 and the slave device 104, EDC information for data transmission, and/or information on an acknowledgement signal. For example, if the communication parameters include a transmission speed or bit rate, the adjustment circuit 122 can adjust the transmission speed or bit rate to a higher or lower transmission speed based on the analyzed properties of the received communications signal.

Transmitter 120 is configured to generate a specific signal based on the communication parameters and transmit the specific signal to the master device 102 through the single-wire interface 108 thus the single-wire bus 106. The specific signal can be transmitted based on an adjusted transmission speed based on the adjusted one or more communication parameters. Receiver 118 and/or transmitter 120 can include a counter. In some examples, the specific signal is an acknowledgement signal indicating that the slave device 104 is capable of receiving or transmitting data signals based on the one or more communication parameters.

In some examples, the specific signal is a data signal that is transmitted from the slave device 104 to the single-wire bus 106 based on the one or more communication parameters, e.g., based on the adjusted transmission speed. In some examples, the specific signal is an error signal indicating that the transmitted data includes one or more errors. In some examples, the specific signal is an abort signal indicating that the master device 102 should abort sequential data transmission and/or wait for a period of time.

The system 100 can adopt one or more communication protocols for single-wire communications between the master device 102 and the slave device 104 through the single-wire bus 106, as discussed with further details in FIGS. 2 and 3A-3D. According to an example communication protocol, the master device 102 transmits a sensing signal to the slave device 104 prior to other interactions, e.g., data transmissions, with the slave device 104. The slave device 104 can use content or characteristics of the sensing signal to adjust a speed or timing of responses to the master device 102. The slave device 104 can transmit a specific signal, e.g., an acknowledgement signal, an error signal, or an abort signal, back to the master device 102. Therefore, the slave device 104 can find out some of the characteristics of the master device 102 based on the sensing signal to provide enhanced communication, e.g., higher speed or better reliability.

According to another example communication protocol, the slave device 104 can transmit a sensing signal to the master device 102 prior to other interactions, e.g., data transmissions. The master device 102 can use content or characteristics of the sensing signal to adjust a speed or timing of responses to the slave device 104. The master device 102 can transmit a specific signal, e.g., an acknowledgement signal, an error signal, or an abort signal, back to the slave device 104. Therefore, the master device 102 can find out some of the characteristics of the slave device 104 based on the sensing signal to provide enhanced communication, e.g., higher speed or better reliability.

In some cases, a communication protocol can work for bi-directional transmission between the master device 102 and the slave device 104. The communication protocol can enable the system 100 to accommodate variability of either the master device 102 or the slave device 104, e.g., speed and/or timing variations. The communication protocol can also provide a more fine-grained control in situations where the speed or timing characteristics are varying rapidly.

Example Timing Diagram

Figure 2:
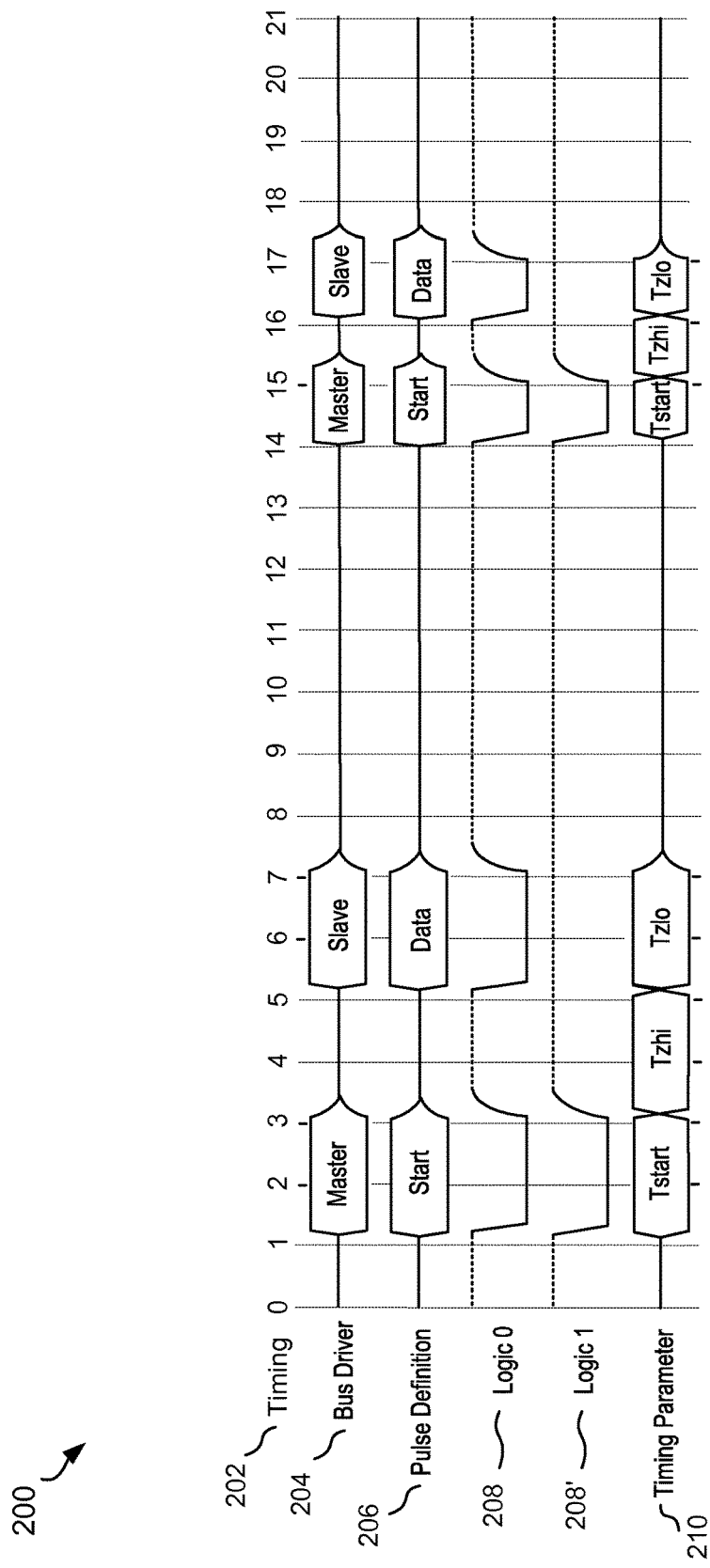
FIG. 2 is an example timing diagram illustrating a communication protocol.

FIG. 2 shows an example timing diagram 200 illustrating a communication protocol for a single-wire communication system, e.g., the system 100 of FIG. 1. At different timing points 202, a bus driver 204 of a single-wire bus, e.g., the single-wire bus 106 of FIG. 1, can be a master device, e.g., the master device 102 of FIG. 1, or a slave device, e.g., the slave device 104 of FIG. 1.

The bus driver 204 can impose one or more pulses 206 on the single-wire bus. The one or more pulses 206 can represent a logic zero 208 or a logic one 208'. For example, a start pulse is followed by a presence or absence of a data pulse a specific time after the start pulse. The presence or absence of the data pulse indicates a logic-zero or logic-one symbol, respectively. A timing parameter of the start pulse can be a pulse width of the start pulse, which can be used as a reference time for the data pulse, as discussed in further detail below.

For purposes of illustration, according to a communication protocol, prior to any data transmission between the master device and the slave device, e.g., each bit level transaction, the master device transmits a sensing signal, e.g., a start pulse, to the slave device through the single-wire bus. The slave device receives the start pulse and analyzes the timing parameter of the start pulse, e.g., the pulse width Tstart, and adjusts a delay timing parameter Tzhi, and a transmission timing parameter Tzlo based on the timing parameter Tstart of the start pulse. The delay timing parameter Tzhi can be identical to the timing parameter of the start pulse Tstart, that is, Tzhi=Tstart. The transmission timing parameter Tzlo can be also identical to the timing parameter of the start pulse Tstart, that is, Tzlo=Tstart. In some examples, during the delay defined by Tzhi, the master device imposes a communications signal having a high level on the single-wire bus, such that the slave device can draw power from the single-wire bus.

The slave device waits for a period defined by the delay timing parameter Tzhi and transmits a data pulse to the master device through the single-wire bus based on the transmission timing parameter Tzlo. An end of a transmission is detected by a presence of a high-level pulse for a time period (timeout) longer than a reference duration. The timing parameter of the start pulse can be used as the reference duration for timeout. For example, the slave device can determine the timing parameter of the start pulse and impose the high-level pulse on the single-wire bus for timeout after transmitting the data pulse.

In a later time, for a sequential data transmission, the master device transmits a new start pulse to the slave device through the single-wire bus. The new start pulse has a smaller timing parameter Tstart than the previous start pulse, that is, a shorter pulse width or a higher transmission speed. The slave device receives the new start pulse and analyzes the new timing parameter of the new start pulse. Based on the analyzed timing parameter of the new start pulse, the slave device adjusts the delay timing parameter Tzhi and the transmission timing parameter Tzlo. For example, the slave device adjusts Tzhi and Tzlo to be identical to the new timing parameter Tstart. Then the slave device waits for a new delay period defined by the adjusted delay timing parameter Tzhi and transmits a new data pulse to the master device based on the adjusted transmission timing parameter Tzlo.

In some cases, the sensing signal includes two or more start pulses. A division of the time between the two or more start pulses, instead of the actual pulse width of a start pulse, can be defined as the reference time. The slave device can determine the communication parameters, including the delay timing parameter, the transmission timing parameter, and/or the reference duration for timeout, based on the reference time. In some cases, according to a communication protocol, the slave device or the master device transmits more than one data pulse after each start pulse.

According to the communication protocol, the slave device can adjust the transmission speed or the timing characteristics for the data pulse based on the timing parameter of the start pulse transmitted from the master device. There is no requirement for the master device to analyze and/or determine the timing parameter of the start pulse transmitted to the slave device. The communication protocol enables the slave device to accommodate variability of the master device to realize adaptive speed single-wire communications. According to the communication protocol, the master device can speed up or slow down and scale the entire system timing proportionally.

Example Communication Protocols

FIGS. 3A-3D show schematic timing diagrams 300 illustrating example communication protocols performed by a single-wire communication system, e.g., the single-wire communication system 100 of FIG. 1. The system includes a master device, e.g., the master device 102 of FIG. 1, and a slave device, e.g., the slave device 104 of FIG. 1. The master device and the slave device communicate through a single-wire bus, e.g., the single-wire bus 106 of FIG. 1.

Communications between the master device and the slave device can be bi-directional. Either the master device or the slave device or both can analyze one or more properties of an exchanged sensing signal on the single-wire bus and adjust their one or more communication parameters accordingly. The communication protocols can be stored in a memory of the slave device and/or a memory of the master device. Upon receiving the exchanged sensing signal, for example, the slave device (or the master device) can determine one or more communication parameters, e.g., a transmission speed of sequential data transmission from/to the master device (or the slave device) and response correspondingly.

Figure 3:
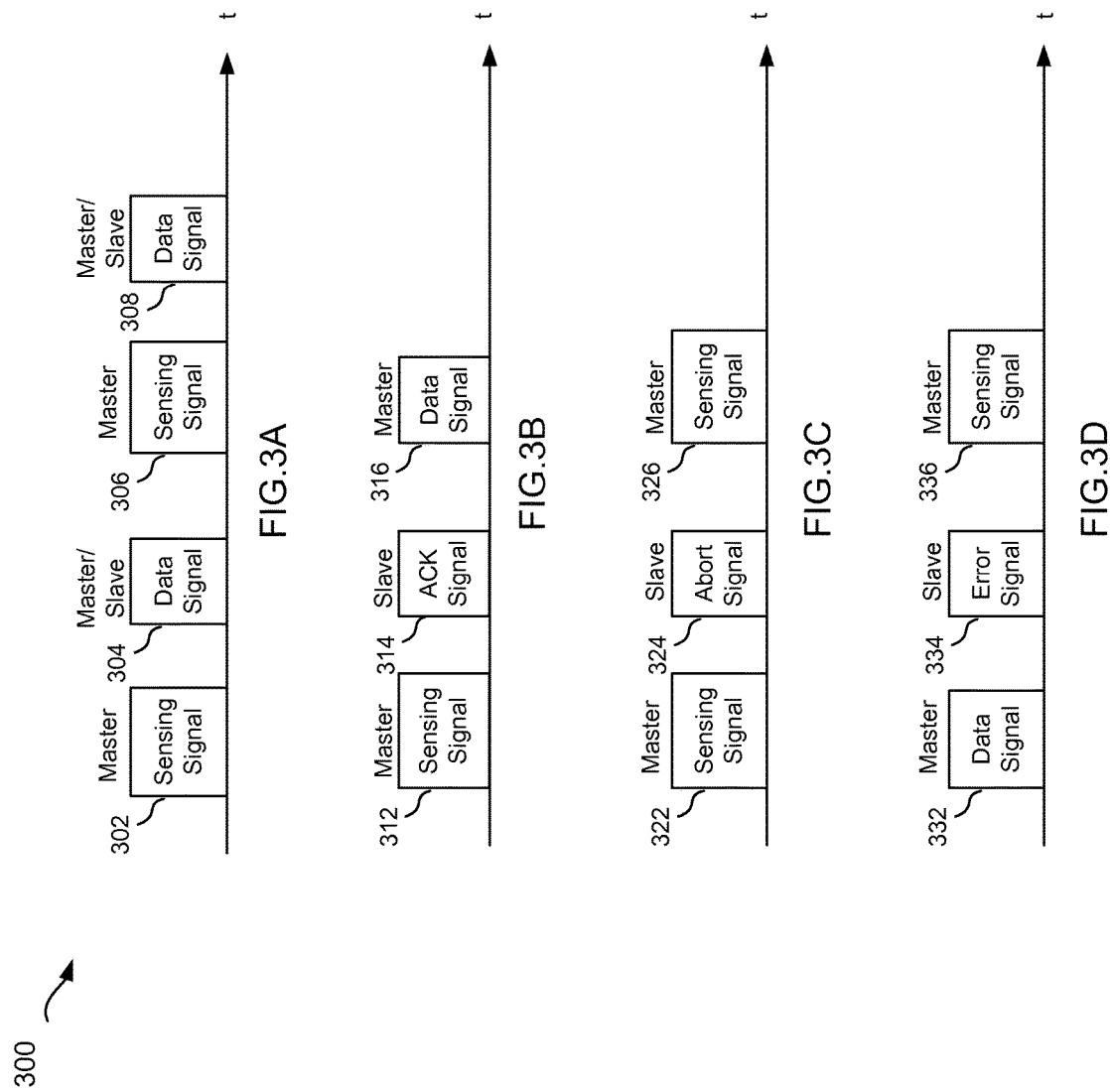
FIGS. 3A-3D show schematic timing diagrams illustrating example communication protocols performed a single-wire communication system.

Referring to FIG. 3A, according to a communication protocol, prior to each package of information to be transmitted, e.g., a data signal 304 or 308, a sensing signal 302 or 306 is exchanged, e.g., transmitted from the master device to the slave device through the single-wire bus. The package of information can be a bit, a byte, a word, a block of data, or an entire message.

As noted above, the slave device can receive the sensing signal and analyze one or more properties of the sensing signal. In some examples, the sensing signal is a pulse generated by the master device and imposed on the single-wire bus. The slave device can analyze a pulse width of the sensing signal and determine a reference time based on the pulse width of the sensing signal. The communication protocol can predefine a relationship between the reference time and one or more timing parameters for sequential data pulses. For example, the pulse width of the sequential data pulse can be defined to be identical to the pulse width of the sensing signal, that is, the transmission speed of the sequential data pulse is determined based on the pulse width of the sensing signal.

In some examples, as noted above, the sensing signal includes two or more pulses. According to the communication protocol, a division of the time between the two or more start pulses, instead of the actual pulse width of a start pulse, can be defined as the reference time.

In some examples, the sensing signal include a constant digital value constructed such that both the master device and the slave device can efficiently extract timing information from the sensing signal. In a particular example, the sensing signal is a byte with a value such as 0X55, which enables that the slave device has multiple opportunities to analyze both zero and one bits. In another example, the sensing signal includes digital information to enhance or modify one or more communication parameters, as discussed in further detail below, e.g., adjusting a transmission speed to be faster or slower or adding or reducing a delay between sequential signals. The sensing signal can also have a form of flag bytes to indicate the slave device both a transmission direction of data signals to follow and a transmission speed.

Based on the determined properties of the sensing signal, e.g., the reference time, the slave device can adjust one or more communication parameters for single-wire communications between the master device and the slave device. For example, the slave device can adjust a transmission speed for sequential data transmission, e.g., by changing position or duration of data pulses or edges. In some cases, a data signal is transmitted from the master device to the slave device, and the slave device can expect to receive the data signal transmitted from the master device based on the transmission speed. In some other cases, a data signal is transmitted from the slave device to the master device, and the slave device can transmit the data signal based on the transmission speed.

The communication parameters can include a transmission direction for sequential data pulses. For example, if the sensing signal is generated by the master device, according to the communication protocol, the slave device can determine that a sequential data signal will be transmitted from the master device to the slave device, or the slave device can determine that a sequential data signal will be transmitted from the slave device to the master device.

The communication parameters can include a reference duration for timeout based on the reference time of the sensing signal. For example, the reference duration can be defined to be identical to the reference time. After completing each data transmission, the slave device or the master device can impose a specific signal, e.g., a high-level pulse, for timeout longer than the reference time.

The communication parameters can include a time period between sequential signals. The time period can be determined based on the reference time, e.g., identical to the reference time. For example, after transmitting the sensing signal for the time period, the master device transmits a data signal to the slave device, or after receiving the sensing signal for the time period, the slave device transmits a data signal to the master device.

In some implementations, the master device waits for the time period, and determines that there is no signal transmitted from the slave device and transmits the data signal to the slave device based on communication parameters substantially same as the communication parameters adjusted by the slave device.

In some implementations, as illustrated in FIG. 3B, after receiving a sensing signal 312 from the master device, the slave device analyzes the sensing signal and adjusts information on an acknowledgement signal, e.g., by changing a size of an element to which the acknowledgement information corresponds. The acknowledge signal can indicate that the sensing signal is capable of communicating data signals with the transmission speed based on the reference time.

The slave device can transmit an acknowledgement signal 314 to the master device. After receiving the acknowledgement signal 314, the master device can analyze the acknowledgement signal 314 to determine whether the slave device is capable of communicating data signals with the transmission speed. In response to determining that the slave device is capable of communicating data signals with the transmission speed, the master device transmits a data signal 316 based on the transmission speed.

In some implementations, as illustrated in FIG. 3C, after receiving the sensing signal 322 from the master device, the slave device analyzes the sensing signal to determine whether a transmission speed based on the sensing signal is acceptable. In some cases, a processor of the master device, e.g., the processor 114 of FIG. 1, has a number of diverse tasks and is too busy to continue communication with the slave device. The master device may transmit a long pulse as the sensing signal. The slave device can determine that the transmission speed based on the sensing signal is too slow.

In response to determining that the transmission speed is too slow, the slave device can choose to abort a sequential data transmission and wait for a more favorable time point. The slave device can initiate a delay and transmit an abort signal 324 to the master device. The abort signal 324 can direct the master device to abort sequential data transmission and wait for a particular period. The particular period can be determined or adjusted by the slave device and included in the abort signal 324. After the particular period, the master device can transmit a new sensing signal 326 to the slave device. The slave device can analyze the new sensing signal 326 and determine whether the transmission speed is acceptable.

In some examples, the abort signal is a digital word that describes the intended action of the slave device. In some examples, the abort signal is a single bit acknowledgement predetermined in the communication protocol that can be recognizable by the master device and the slave device. In some examples, the abort signal includes multiple bits that allow the master device to symmetrically sense configuration information, e.g., the transmission speed, of the slave device. Based on the sensed information, the master device can wait for a favorable time point, e.g., when the processor of the master device has enough execution resources to communicate with the slave device with a transmission speed comparable to the transmission speed of the slave device.

Referring to FIG. 3D, after receiving a data signal 332 transmitted from the master device, the slave device can perform error detection and/or correction on the received data signal 332, e.g., a byte or a block of data. The error detection and/or correction algorithm can include error-correcting code (ECC) scheme or error detection and correction (EDC) scheme. The EDC or ECC scheme can be stored in the slave device and/or the master device. If the slave device determines one or more errors for the data transmission, the slave device can transmit an error signal 334 including information on the errors to the master device.

After receiving the error signal 334, the master device can analyze the error signal 334 to determine the errors. In some implementations, in response to determining the errors, the master device re-transmits the data signal 332 to the slave device. In some implementations, the master device transmits a sensing signal 336 to the slave device. The sensing signal can include information on EDC for data transmission. For example, the information can indicate that parity computation is moved from being calculated over a byte to being calculated over 32 bits to increase reliability. The master device can perform the parity computation on the data signal to be transmitted, and the slave device can obtain the information from the sensing signal and executes error detection and/or correction on the received data signal with the updated parity computation.

According to different communication protocols, a sensing signal can be transmitted optionally at any time. In some cases, the sensing signal is exchanged before each data signal to be transmitted. After each data signal, the sensing signal is re-transmitted for sequential data signal to be transmitted. In some cases, if there is no transmission error for previous data signal, the sensing signal is not required to be transmitted, and the sequential data signal can be transmitted with the same characteristics as the previous data signal, e.g., same transmission speed. The master device and the slave device can retain the last sense result, e.g., the communication parameters based on the sensing signal, until the next sensing signal transmission. In some cases, the sensing signal is exchanged at a fixed time period, e.g., at power-up.

In some cases, the master device issues the sensing signal, e.g., an explicit command word, to the slave device to indicate a desired speed based on system configuration information, prior transfer history or other real-time factors. The desired speed may vary for a bit, a byte, or a larger package. For example, the sensing signal can be exchanged based on error statistics. As noted above, the slave device can determine errors in the data signal and transmit an error signal to the master device. The master device can analyze one or more error signals transmitted from the slave device, e.g., during a period of time, and determine the error statistics or an error rate. When the error rate is higher, the master device can transmit the sensing signal more frequently. When the error rate is lower, the master device can transmit the sensing signal less frequently.

Example Flowchart

Figure 4:
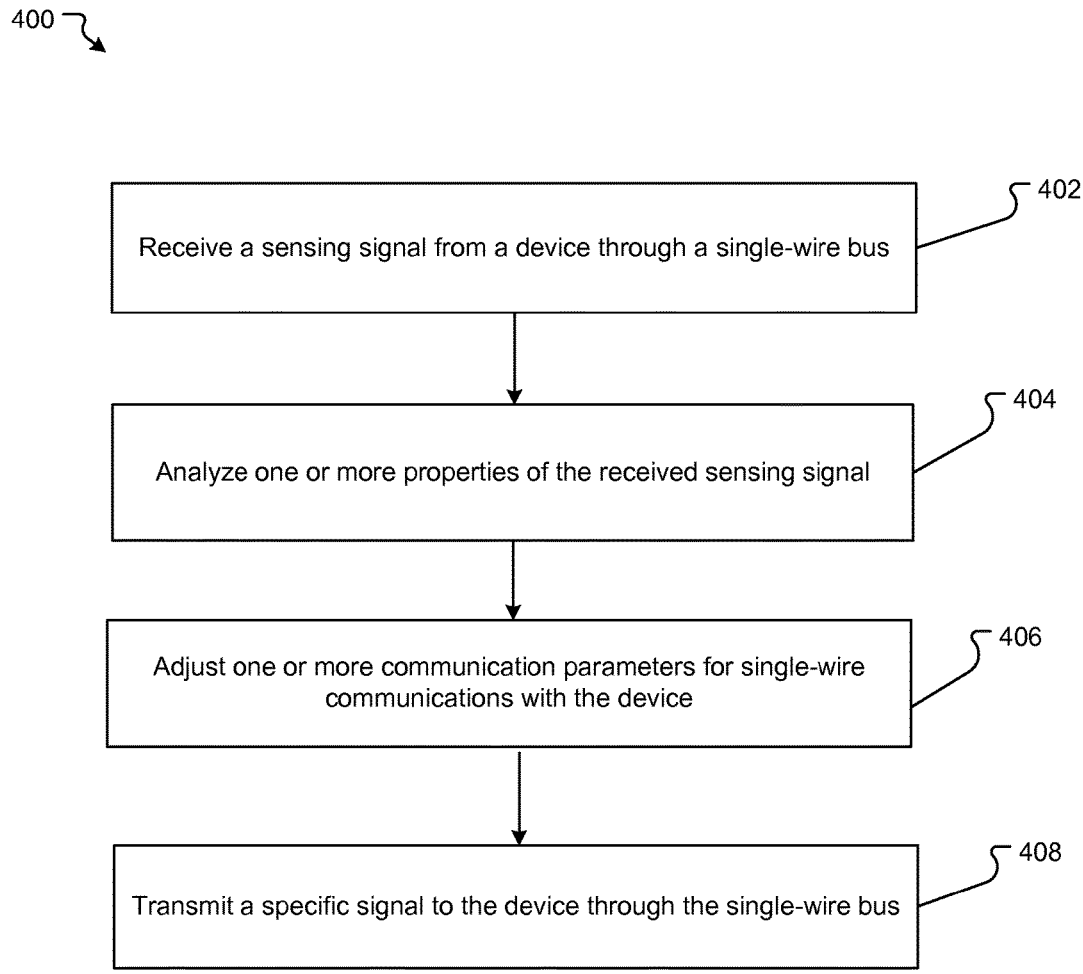
FIG. 4 is a flow diagram of an example process performed by a single-wire communication system.

FIG. 4 is a flow diagram of an example process performed by a single-wire communication system, e.g., the single-wire communication system 100 of FIG. 1. The system includes a first device and a second device. The first device and the second device can communicate through a single-wire bus, e.g., the single-wire bus 106 of FIG. 1, according to one or more single-wire communication protocols. In some implementations, the first device is a slave device, e.g., the slave device 104 of FIG. 1, and the second device is a master device, e.g., the master device 102 of FIG. 1. In some implementations, the first device can be a master device, e.g., the master device 102 of FIG. 1, and a slave device, e.g., the slave device 104 of FIG. 1.

The first device receives a sensing signal from the second device through the single-wire bus (402). As noted above, the sensing signal can be transmitted by the second device at any suitable time point, e.g., before any data transmission such as each bit level transaction. The sensing signal can include one or more pulses.

The first device analyzes one or more properties of the received sensing signal (404). In some examples, the sensing signal includes a pulse, and the one or more properties can include a pulse width of the pulse. In some examples, the sensing signal includes two or more pulses, and the one or more properties can include a division of the time between sequential pulses and/or a pulse width of a pulse. The first device can determine a reference time based on the sensing signal, e.g., to be identical to the pulse width or the division of the time. In some examples, the sensing signal has a constant digital value constructed such that both the second device and the first device can extract timing information from the sensing signal. The first device can evaluate the digital value to determine a transmission speed and/or a direction of data transmission.

The first device adjusts one or more communication parameters for single-wire communications with the second device (406). The first device can adjust the one or more communication parameters based on the analyzed properties of the sensing signal. As noted above, the first device can increase or decrease a transmission speed for data transmission from or to the second device, add or decrease a delay between sequential signals to be transmitted, change parity computation on EDC for transmitted data signals, or change a size of an element to which an acknowledgement signal corresponds. In some cases, the analyzed one or more properties include error detection, and the one or more communication parameters include information on error detection and optionally error correction for data transmission based on the analyzed error detection.

The first device transmits a specific signal to the master device through the single-wire bus (408). In response to receiving the sensing signal, the first device can transmit the specific signal to the second device. The specific signal can be a data signal. The first device can transmit the data signal based on the communication parameters adjusted by the first device, e.g., the transmission speed and/or the EDC information. The first device can wait for a period before transmitting the specific signal. The period is the delay between sequential signals adjusted by the first device.

The specific signal can be an acknowledgement signal indicating that the first device is capable of receiving or transmitting data signals based on the one or more communication parameters. The specific signal can be an abort signal indicating that the second device should abort sequential data transmission and wait for a particular period. The specific signal can be an error signal including one or more errors of the transmitted data signal. The specific signal can include information on a pulse for power transmission. For example, the first device has power management limitations.

Based on the analyzed properties of the sensing signal, the first device can adjust pulse parameters for power transmission and transmit the specific signal indicating the second device to issue shorter (or lower) pulses for power transmission based on the adjusted pulse parameters.

Particular embodiments of the subject matter described in this specification can be implemented so as to realize one or more of the following advantages. First, by exchanging a sensing signal between devices prior to data transmission, a single-wire communication system can dynamically change its timing based on real time communication measurements. Second, a slave device or a single-wire device in the system can adjust timing characteristics for data transmission based on the exchanged sensing signal, e.g., transmitted from a master device in the system, and accommodate variability of the master device to realize adaptive speed single-wire communications. Third, the master device is not required to analyze and/or determine characteristics of the sensing signal, and the slave device can analyze the sensing signal to find out characteristics of the master device to provide enhanced communication, e.g., higher speed or better reliability. Thus, the master device can scale the entire system timing proportionally. Such scaling by the master device can be intentional or unintentional as the system load and/or responsiveness may change. Fourth, the single-wire communication system can work for bi-directional transmission between the master device and the slave device, which enables the system to accommodate speed/timing variability of either the master device or the slave device or both. Fifth, the single-wire communication system provides a more fine-grained control in situations where the speed or timing characteristics are varying rapidly. Such a system is more tolerant of timing variations, and the system need not be tightly tuned, nor doe it need to be consistent in its bus timing. It can adapt to varying conditions by slowing or speeding up the bus timing on the fly. Sixth, the single-wire communication system is more timing robust and can adapt to system timing variation without errors or the need for data re-transmission. Seventh, the single-wire communication system can be used for digital communications such as for single-wire interfaces in cost/space constrained systems or systems with very variable performance such as phones or tablets.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method comprising:
   receiving, at a first device, a sensing signal from a second device through a single-wire bus according to a communication protocol;
   analyzing, at the first device, one or more properties of the received sensing signal to determine a change of a reference time, the sensing signal comprising one or more pulses, the one or more properties including a change of a pulse width of the sensing signal, the change of the reference time being determined based on the change of the pulse width of the sensing signal;
   adjusting, at the first device and based on the analyzed one or more properties, one or more communication parameters for single-wire communications between the first device and the second device, the one or more communication parameters including a transmission speed, the transmission speed being adjusted based on the determined change of the reference time, wherein the one or more communication parameters include a delay timing parameter and a reference duration for timeout, and wherein the delay timing parameter and the reference duration for timeout are adjusted based on the determined change of the reference time;
   waiting for a period of time defined by the adjusted delay timing parameter;
   after waiting for the period of time, transmitting, from the first device, a specific signal to the second device through the single-wire bus at the adjusted transmission speed based on the adjusted one or more communication parameters; and
   after transmitting the specific signal, imposing a high-level pulse on the single-wire bus for a timeout period longer than the adjusted reference duration for timeout.

2. The method of claim 1, further comprising:
   after receiving the sensing signal, receiving, at the first device, a data signal from the second device through the single-wire bus, the data signal being transmitted based on communication parameters substantially the same as the adjusted communication parameters.

3. The method of claim 2, wherein the data signal includes one of a bit, a byte, a word, a block of data, and an entire data message.

4. The method of claim 2, further comprising:
   after receiving the data signal, receiving, at the first device, a second sensing signal from the second device through the single-wire bus;
   analyzing, at the first device, one or more second properties of the received second sensing signal; and
   adjusting, based on the analyzed one or more second properties of the second sensing signal, the one or more communication parameters for the single-wire communications between the first device and the second device.

5. The method of claim 2, wherein the specific signal includes an error signal indicating that the received data signal includes one or more errors, and
   wherein the method further comprises, receiving, at the first device, the sensing signal from the second device at a sensing frequency that is based on an error rate of one or more error signals transmitted to the second device.

6. The method of claim 1, wherein the sensing signal includes a digital value indicating the transmission speed and optionally a transmission direction between the first device and the second device.

7. The method of claim 6, wherein analyzing one or more properties of the received sensing signal comprises evaluating the digital value of the sensing signal to determine the transmission speed and optionally the transmission direction.

8. The method of claim 1, wherein the specific signal is a data signal, and
wherein transmitting the specific signal comprises transmitting the data signal after a period that is determined based on the one or more communication parameters.

9. The method of claim 1, wherein the specific signal directs the second device to abort sequential data transmission and wait for a particular period.

10. The method of claim 1, wherein the specific signal is an acknowledgement signal indicating that the first device is capable of receiving or transmitting data signals based on the one or more communication parameters.

11. The method of claim 1, wherein the one or more communication parameters include at least one of a transmission speed, a time period between sequential signals, information on error-detection and correction (EDC) for data transmission, or information on an acknowledgement signal.

12. The method of claim 1, wherein the analyzed one or more properties include error detection, and the one or more communication parameters include information on error detection and optionally error correction for data transmission based on the analyzed error detection.

13. The method of claim 1, wherein adjusting one or more communication parameters comprises adjusting the transmission speed to a higher or lower transmission speed such that the specific signal is transmitted at the higher or lower transmission speed.

14. The method of claim 1, wherein the first device receives power from the second device through the single-wire bus.

15. The method of claim 14, wherein the analyzed one or more properties include information on power transmission,
wherein adjusting one or more communication parameters comprises adjusting pulse parameters for power transmission based on the information on power transmission, and
wherein the transmitted specific signal indicates the second device to transmit a pulse based on the adjusted pulse parameters.

16. The method of claim 1, wherein the one or more properties include a change of a duration between sequential pulses in the sensing signal.

17. The method of claim 1, wherein the one or more communication parameters for single-wire communications between the first device and the second device comprise at least one of:
a delay time period between the first device receiving the sensing signal and transmitting the specific signal, or
a transmission pulse width of the special signal.

18. The method of claim 1, wherein the sensing signal indicates a desired transmission speed based on configuration information of the second device, prior transfer history or other real-time factors, and
wherein the system configuration information of the second device comprises at least one of available execution resources of a processor, a system load, or system responsiveness.

19. The method of claim 1, wherein, according to the communication protocol, the second device is configured to transmit a respective sensing signal to the first device prior to each data transmission between the first device and the second device.

20. A device comprising:
an interface configured to couple to a single-wire bus and receive a communications signal from a second device through the single-wire bus;
a receiver configured to receive a sensing signal from the second device through the single-wire bus according to a communication protocol and analyze one or more properties of the sensing signal to determine a change of a reference time, the sensing signal including one or more pulses, the one or more properties including a change of a pulse width of the sensing signal, the change of the reference time being determined based on the change of the pulsed width of the sensing signal;
an adjustment circuit configured to adjust one or more communication parameters for communication with the second device based on the analyzed one or more properties of the sensing signal, the one or more communication parameters including a transmission speed, the transmission speed being adjustable based on the change of the reference time, wherein the one or more communication parameters include a delay timing parameter and a reference duration for timeout, and wherein the delay timing parameter and the reference duration for timeout are adjusted based on the determined change of the reference time; and
a transmitter configured to transmit, after waiting for a period of time defined by the adjusted delay timing parameter, a specific signal to the second device through the single-wire bus at an adjusted transmission speed based on the adjusted one or more communication parameters, and after transmitting the specific signal, impose a high-level pulse on the single-wire bus for a timeout period longer than the adjusted reference duration for timeout.

21. The device of claim 20, wherein, after receiving the sensing signal, the receiver receives a data signal from the second device through the single-wire bus, the data signal being transmitted based on communication parameters substantially the same as the one or more communication parameters.

22. The device of claim 21, wherein the data signal includes one of a bit, a byte, a word, a block of data, and an entire data message.

23. The device of claim 21 configured to:
execute error detection and optionally error correction on the received data signal and transmit information on the error detection to the second device through the single-wire bus.

24. The device of claim 21 configured to:
after receiving the data signal, receive a second sensing signal from the second device through the single-wire bus,
analyze one or more second properties of the received second sensing signal; and
adjust the one or more communication parameters for the single-wire communications based on the analyzed one or more second properties of the second sensing signal.

25. The device of claim 21, wherein the specific signal includes an error signal indicating that the received data signal includes one or more errors, and
wherein the receiver is operable to receive the sensing signal from the second device at a sensing frequency that is based on an error rate of one or more error signals transmitted to the second device.

26. The device of claim 20, wherein the sensing signal includes a digital value indicating the transmission speed and optionally a transmission direction between the device and the second device.

27. The device of claim 26, wherein analyzing one or more properties of the received sensing signal comprises evaluating the digital value of the sensing signal to determine the transmission speed and optionally the transmission direction.

28. The device of claim 20, wherein the specific signal directs the second device to abort sequential data transmission and wait for a particular period.

29. The device of claim 20, wherein the specific signal is an acknowledgement signal indicating that the single-wire device is capable of receiving or transmitting data signals based on the one or more communication parameters.

30. The device of claim 20, wherein the one or more communication parameters include at least one of a transmission speed, a time period between sequential signals, information on error detection and correction (EDC) for data transmission, or information on an acknowledgement signal.

31. The device of claim 20 configured to receive power from the second device through the single-wire bus at the interface.

32. A non-transitory, computer-readable storage medium configured to store instructions, which, when executed by one or more processors, causes the one or more processors to perform operations comprising:
receiving a sensing signal from a device through a single-wire bus according to a communication protocol;
analyzing one or more properties of the received sensing signal to determine a change of a reference time, the sensing signal including one or more pulses, the one or more properties including a change of a pulse width of the sensing signal, the change of the reference time being determined based on the change of the pulse width of the sensing signal;
adjusting one or more communication parameters for single-wire communications with the device based on the analyzed one or more properties, the one or more communication parameters including a transmission speed, the transmission speed being adjusted based on the determined change of the reference time, wherein the one or more communication parameters include a delay timing parameter and a reference duration for timeout, and wherein the delay timing parameter and the reference duration for timeout are adjusted based on the determined change of the reference time;
waiting for a period of time defined by the adjusted delay timing parameter;
after waiting for the period of time, transmitting a specific signal to the device through the single-wire bus at the adjusted transmission speed based on the adjusted one or more communication parameters; and
after transmitting the specific signal, imposing a high-level pulse on the single-wire bus for a timeout period longer than the adjusted reference duration for timeout.

* * * * *